US00RE40345E

(19) United States
(12) Reissued Patent
Duffy

(10) Patent Number: US RE40,345 E
(45) Date of Reissued Patent: May 27, 2008

(54) POWERED OSCILLATING HAND TOOL

(75) Inventor: Colin Duffy, Spennymoor (GB)

(73) Assignee: Black & Decker, Inc., Newark, DE (US)

(21) Appl. No.: 10/122,747

(22) Filed: Sep. 6, 2002

(Under 37 CFR 1.47)

Related U.S. Patent Documents

Reissue of:
(64) Patent No.: 6,179,696
Issued: Jan. 30, 2001
Appl. No.: 09/298,579
Filed: Apr. 23, 1999

(30) Foreign Application Priority Data

Apr. 29, 1998 (GB) ..... 9809030

(51) Int. Cl.
*B24B 23/00* (2006.01)
*B24B 27/08* (2006.01)

(52) U.S. Cl. ..... 451/357; 451/359
(58) Field of Classification Search ..... None
See application file for complete search history.

(56) References Cited

U.S. PATENT DOCUMENTS

| | | | | |
|---|---|---|---|---|
| 2,893,177 A | * | 7/1959 | Bruck | 451/356 |
| 3,345,784 A | * | 10/1967 | Stelljes et al. | 451/357 |
| 3,849,943 A | * | 11/1974 | Thomas et al. | 451/357 |

(Continued)

FOREIGN PATENT DOCUMENTS

| | | | |
|---|---|---|---|
| CA | 707935 | * 4/1965 | |
| DE | 620782 | * 10/1935 | |
| DE | 1502526 | * 6/1969 | |
| DE | 1652152 | * 5/1970 | |
| DE | 2907930 | * 12/1980 | |
| DE | 4011761 | * 10/1991 | |
| EP | 0190775 | * 8/1986 | |
| EP | 0227644 | * 7/1987 | |
| EP | 0333933 | * 9/1989 | |
| EP | 0372376 | * 6/1990 | |
| EP | 000525328 A1 | * 5/1992 | |
| EP | 491162 | * 6/1992 | 451/357 |
| EP | 0525328 | * 2/1993 | |
| EP | 0579949 | * 1/1994 | |
| EP | 0710527 | * 5/1996 | |
| FR | 2158864 | * 6/1973 | |
| FR | 21113500 | * 6/1973 | |
| GB | 602431 | * 5/1948 | |
| GB | 1322283 | * 7/1973 | |
| GB | 2084059 | * 4/1982 | |
| GB | 2142261 | * 1/1985 | |
| WO | 870924 | * 5/1987 | |

OTHER PUBLICATIONS

Pages from Black & Decker 1984 Power Tools Catalog with various palm grip sanders.

Pages from Black & Decker 1993–94 Power Tools Catalog with 7441 "Quick Finish" Power Sanding Block.

Pages from DeWalt 1997 Catalog with various palm sanders.

Pages from Black & Decker 1991–92 Power Tools & Accessories Professional & Home Use Catalog with 4011 Palm Grip Sander and 7441 Power Sanding Block.

*Primary Examiner*—Timothy V. Eley
(74) *Attorney, Agent, or Firm*—Niro, Scavone, Haller & Niro

(57) ABSTRACT

A powered oscillating hand tool includes a drive unit having an electric motor and a drive shaft; a bearing eccentrically mounted on the drive shaft and located radially eccentrically relative to the drive shaft; a carrier plate mounted on the bearing and a platen for mounting on the carrier plate. The carrier plate is provided with a first engagement means and the platen is provided with second engagement means to engage with the first engagement means by rotation of the platen relative to the carrier plate. The first and second engagement means together comprise a bayonet fitting.

40 Claims, 2 Drawing Sheets

U.S. PATENT DOCUMENTS 3,864,884 A * 2/1975 Weissman ..... 451/490
4,302,910 A * 12/1981 Tschacher ..... 451/295
4,475,317 A * 10/1984 Dicke ..... 451/356
D310,007 S * 8/1990 Saito et al. ..... D8/62
D326,398 S * 5/1992 Fushiya et al. ..... D8/62
5,123,216 A * 6/1992 Kloss et al. ..... 451/357
D332,734 S * 1/1993 Fushiya et al. ..... D4/102
5,398,454 A * 3/1995 Berner ..... 451/357
5,425,666 A * 6/1995 Frank et al. ..... 451/344
5,439,413 A * 8/1995 Lagler ..... 451/353
5,470,272 A * 11/1995 Kikuchi et al. ..... 451/344
5,554,066 A * 9/1996 Bosten et al. ..... 451/356
5,597,347 A * 1/1997 Bosten et al. ..... 451/356
5,626,510 A * 5/1997 Bergner et al. ..... 451/357
5,637,034 A * 6/1997 Everts et al. ..... 451/344
D380,950 S * 7/1997 Gildersleeve et al. ..... D8/62
D386,376 S * 11/1997 Kaneko et al. ..... D8/62
5,709,596 A * 1/1998 Alexander et al. ..... 451/357
D392,861 S * 3/1998 Gildersleeve et al. ..... D8/62
5,813,903 A * 9/1998 Amano et al. ..... 451/294
D404,273 S 1/1999 Somers
D408,245 S * 4/1999 Evans et al. ..... D8/62
D435,768 S * 1/2001 Duffy ..... D8/62
D447,397 S * 9/2001 Netzler ..... D8/62

* cited by examiner

POWERED OSCILLATING HAND TOOL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a powered oscillating hand tool, in particular oscillating hand tool comprising a drive unit having an electric motor with a drive shaft to which a sander head can be attached.

2. Description of the Prior Art

In conventional sanders of the orbital type, with a shaped shoe, the drive system comprises an eccentric which is restrained so that the sander shoe cannot spin independently of the motor and it therefore describes a regular orbit. The shoe of such sanders are available in a range of shapes and such sanders are in general used for the removal of relatively small quantities of material, for example for detailed work or for finishing. The base of the shoe may be provided with a surface, in particular a hook and loop surface, on which an abrasive sheet may be mounted.

European Patent No 610 801 describes a sander which carries a triangular shoe which can be detached from the body of the sander by means of an operating button located at the front corner of the sander. The operating button carries a bolt which is resiliently mounted on the tool and is biased towards engagement under a catch hook provided in the triangular shoe. The sander is further provided, on the edge opposite the operating button, with at least one engagement opening for engaging at least one support claw provided on the triangular shoe.

It is a disadvantage of such an arrangement that it is expensive to manufacture and may be difficult to operate to attach and detach the shoe, in particular under the conditions in which the sander is likely to be used.

SUMMARY OF THE INVENTION

It is an object of the present invention to provide a sander in which the above disadvantages are reduced or substantially obviated.

The present invention therefore provides a powered oscillating hand tool comprising (a) a drive unit having an electric motor and a drive shaft;

(b) a bearing eccentrically mounted on the drive shaft and located radially eccentrically relative to the drive shaft;

(c) a carrier plate mounted on the bearing and (d) a platen for mounting on the carrier plate characterised in that the carrier plate is provided with a first engagement means and the platen is provided with second engagement means to engage with the first engagement means by rotation of the platen relative to the carrier plate.

The first and second engagement means preferably together form a bayonet fitting, more preferably a bayonet fitting of the type in which the first engagement means (provided on the carrier) is in the form of one or more apertures and the second engagement means is in the form of one or more hook members.

BRIEF DESCRIPTION OF THE DRAWINGS

An embodiment of a powered oscillating hand tool according to the invention will now be described with reference to the accompanying drawings in which.

DETAILED DESCRIPTION OF THE INVENTION

Figure 1:
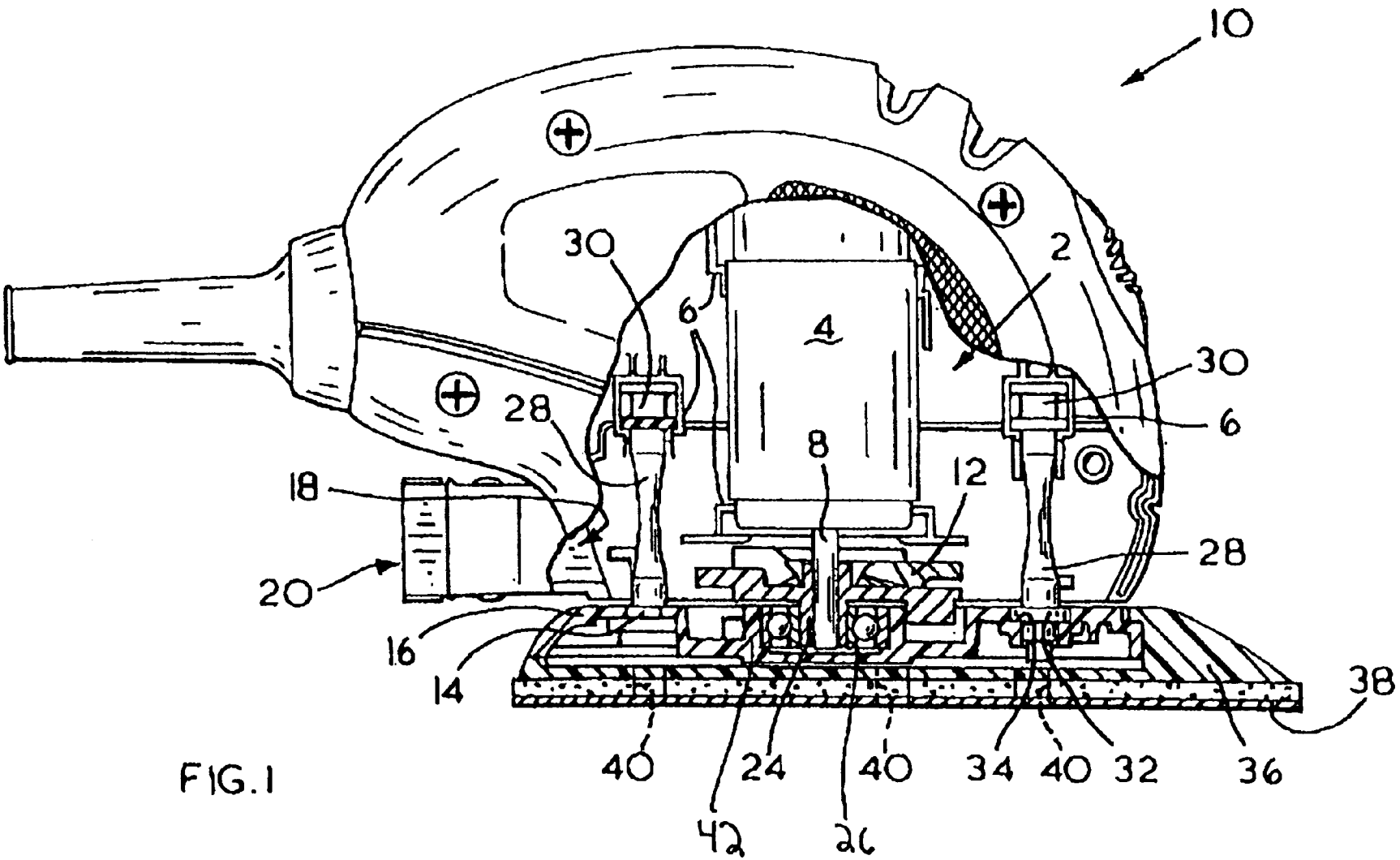
FIG. 1 is a side view, in section of a preferred embodiment of a powered oscillating hand tool according to the invention, with a platen attached.

FIG. 1 shows a sanding device (10) comprising a drive unit (2) including an electric motor (4) located in a housing (6) and a drive shaft (8). A fan (12) mounted on shaft (8) is arranged to draw air in from mouth (14) of a carrier plate (16) permanently mounted to the sanding device (10) and direct it through extractor duct (18) to exhaust outlet (20). Mounted on the drive shaft (8) is a counterbalance (24). The counterbalance (24) is necessary because mounted thereon is a bearing (26). The bearing (26) is eccentrically mounted relative to the drive shaft (8) and hence the need for the counterbalance (24). It will be readily appreciated by those skilled in the art that the counterbalance (24) has an excess of weight in the radial direction (relative to the axis of the drive shaft (8)) diametrically opposite to that of the radial direction in which the bearing (26) projects furthest away from the drive shaft (8).

Any suitable method of mounting the counterbalance (24) on the drive shaft (8) may be employed. In this example, a simple press-fit is used. The same method may be employed to mount the bearing (26) on the counterbalance (24).

In the example shown with reference to FIG. 1, the counterbalance (24) and the fan (12) are formed as a single unit around the drive shaft (8). This is simply for ease of manufacture. They could each be formed as separate units and individually mounted on the drive shaft (8).

The carrier plate (16) is mounted on the bearing (26) by any suitable means. In the present example, the carrier (16) is press-fitted into engagement with the bearing (16) although it could equally well be secured by moulding or using a nut or the like.

Three flexible columns (28) made of rubber are arranged around the drive shaft (8). The upper end (30) of each of the flexible columns (28) is held in the housing (6) and the lower end (32) is located in a recess (34) provided in the carrier plate (16).

A platen (36) is detachably mounted on the carrier plate (16), as will be described in more detail with reference to FIGS. 2 and 3.

The carrier (16) is driven by the electric motor (4) through drive shaft (8). Rotation of the drive shaft (8) will cause the radially internal portion of the bearing (26) to rotate concomitantly. Because the radially external portion of the bearing (26) is in rigid contact with the carrier (16), then this particular portion does not rotate. Because the carrier (16) is restrained from free rotation by the flexible columns (28), then the carrier (16) will exhibit an orbital motion on rotation of the drive shaft (8). A perforated sandpaper sheet (not shown) may be attached to the outer face (38) of the platen (36), for example by the use of hook-and-loop fabric such as that sold as VELCRO® glued to face (38). Holes (40) passing through the platen (36) facilitate the removal of dust etc., from the sanding face through the platen (36) to exhaust outlet (20) via the duct (18). An extractor hose (not shown) may be attached to the exhaust outlet (20).

Figure 2:
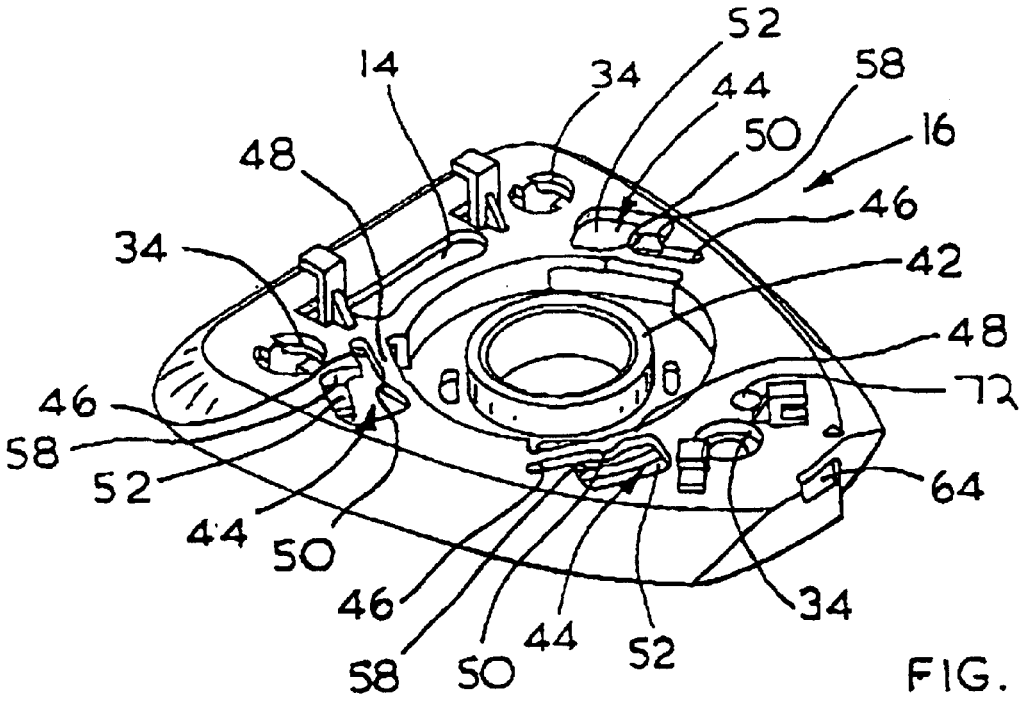
FIG. 2 is a perspective view of the carrier plate of FIG. 1, viewed from above.

As can be seen from FIG. 2, the carrier plate (16) is made from a plastics material, for example glass filled nylon and carries on its underside a plurality of strengthening ribs (not shown). The carrier plate (16) includes three recesses (34) which are used to couple the carrier plate (16) to the sanding device (10) by means of the flexible columns (28) which locate in the recesses (34) in known manner. The centre of the carrier plate (16) has a boss (42) which is used to mount the carrier plate on the bearing (26).

The carrier plate (16) has a plurality of holes (44) formed therein and spaced at 120° around the central boss (42). The holes (44) are formed so that each can accept one of a plurality of projections formed on the platen (36) which will be described in more detail below. The holes (44) are shaped so as to provide an area of relatively large cross sectional area which narrows down to a strip of narrow width. Flanking each hole (44) and extending substantially along the length from the relatively large cross-sectional area to the end of the relatively narrow strip is a further hole (46). These holes (46) narrower than holes 44 and are formed so as to allow the piece of plastics material (48) from which the carrier plate (16) is formed and which is situated between the holes (44) and (46) to act as a spring mechanism. The hole (44) is shaped so that an inwardly projecting piece (50) of the plastics material of the carrier plate (16) is formed at the position shown and acts as a detent.

It will also be seen from FIG. 2 that each hole (44) is associated with a vertically displaced platform (52) which projects inwardly opposite detent (50). Flat wall (58) extends vertically upward along one side of platform (52).

The platen (36) is provided with a plurality of projections (54) projecting from the inner face of the platen (36). In order to mount the platen (36) on the carrier plate (16) the platen (36) is oriented such that projections (54) are situated directly below each of the holes (44). The platen (36) is then urged toward the carrier plate (16) so that the projections (54) protrude through their respective holes (44). As can be seen from the relative orientation of each of the projections (54) and holes (44), when the platen (36) is rotated by approximately 24° then the outer peripheral shapes of the platen (36) and carrier plate (16) coincide and also the projections (54) are rotated about the boss (42) such that they are held within the holes (44) by way of the projection (50) acting as a detent and also the strip of material (48) of the carrier plate (16) between the holes (44) and (46) acting as a spring urging this detent into engagement with each projection (54). As can be seen in particular from FIG. 3, each projection (54) has an overhanging hook (60) which further includes a portion (56) formed as a flat face. When the platen (36) and carrier plate (16) are rotated so as to be locked together as described above, this portion (56) lies flat against face (58) of the carrier plate (16). This is necessary so that the majority of the oscillating driving force is imparted to platen (36) by the carrier plate (16) through these flat and abutting faces (56), (58). The platen (36) is retained from separating and therefore falling off the carrier plate (16) by way of hook (60) shown in FIG. 3 co-operating with the platform (52). As has been described above, the platform (52) is situated in a plane which is vertically displaced from the plane of the carrier plate (16) and standing proud thereof. The hook (60) therefore sits between the platform (52) and the plane of the carrier plate (16) and in this way the platform (52) acts as a vertical catch for the hook (60).

Figure 3:
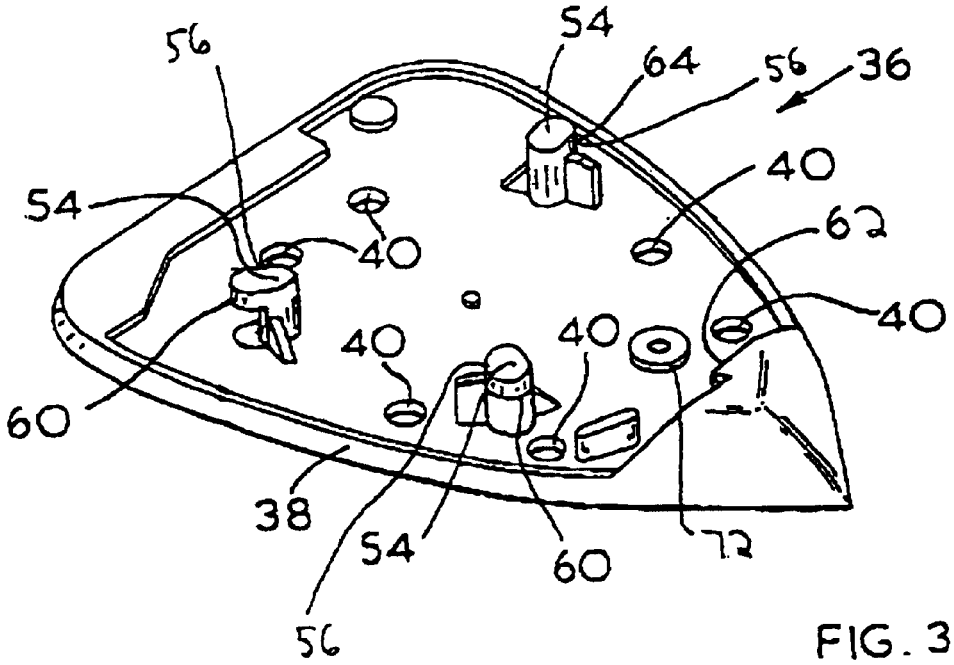
FIG. 3 is a perspective view of the platen of FIG. 1, viewed from above.

In order to prevent the tip portion of the platen (36) coming away from the carrier plate (16) the platen (36) carries a first ramp surface (62) as shown in FIG. 3, which ramp surface (62) co-operates with a second ramp surface (64) in the carrier plate (16). It will be understood that the coupling mechanism between the first ramp surface (62) and second ramp surface (64) operates to engage the two surfaces, when the platen is rotated to engage the projection (54) and its hook (60).

As can also be seen from FIGS. 2 and 3 a screw (not shown) aids securing the platen (36) to the carrier (16) in addition to the coupling mechanism described above. In particular, the screw serves primarily to prevent the platen (36) from rotating relative to carrier (16) during orbital motion. A boss (70) acts as a guide hole for the passage of the screw (not shown) through the platen (36). The screw then screws into the threaded blind hole (72) in the carrier (16) to secure the platen (36) to the carrier (16).

One more alternatively platen (36) can be provided, for use in different sanding operations, such as for detail sanding, sanding louvres, where the platen is provided with a finger extension and contour sanding.

What is claimed is:

1. A power oscillating hand tool comprising:

a drive unit;

a carrier plate interconnected to the drive unit, the carrier plate including a plurality of first holes, each of the plurality of first holes partially defined by an inwardly projecting detent extending from one side thereof, the carrier further including a plurality of second holes, at least one of the second holes formed adjacent each of the first holes and providing an inward spring bias to the detents; and a platen releasably secured on the carrier plate including a plurality of projections extending from an upper surface thereof, each projection extending through an associated first hole and cooperating with the associated first hole to maintain the platen on the carrier;

the detents each being biased into contact with an associated one of the projections.

2. The power oscillating hand tool of claim 1, wherein each of the projections includes a hook.

3. The power oscillating hand tool of claim 2, wherein the hook of each of the projections includes a flat face abutting a substantially vertical face of the associated first hole.

4. The power oscillating hand tool of claim 1, wherein each of the first holes is partially defined by a substantially horizontal platform abutting an underside of an associated one of the projections.

5. The power oscillating hand tool of claim 1, further comprising a central boss and wherein the first holes are radially spaced about the central boss.

6. The power oscillating hand tool of claim 5, wherein the plurality of first holes includes three first holes equally spaced radially about the central boss.

7. The power oscillating hand tool of claim 1, wherein the platen includes a first ramp surface and the carrier plate includes a second ramp surface, the first and second ramp surfaces cooperating to secure a tip portion of the platen to the carrier plate.

8. The power oscillating hand tool of claim 1, wherein each of the first holes extends completely through the carrier plate.

9. The power oscillating hand tool of claim 1, wherein the tool is a sander.

10. A power oscillating hand tool comprising:

a drive unit;

a carrier plate interconnected to the drive unit, the carrier plate including a plurality of first holes, each of the first holes extending between a lower side of the carrier plate and an upper side of the carrier plate; and a platen releasably secured on the carrier plate including a plurality of projections extending from an upper surface thereof, each projection corresponding to at least one of the first holes and including a portion abutting the upper side of the carrier plate.

11. The power oscillating hand tool of claim 10, wherein each of the projections includes a hook.

12. The power oscillating hand tool of claim 11, wherein the hook of each of the projections includes a flat face abutting a substantially vertical face of the associated first hole.

13. The power oscillating hand tool of claim 10, wherein each of the first holes is partially defined by a substantially horizontal platform abutting an underside of an associated one of the projections.

14. The power oscillating hand tool of claim 10, further comprising a central boss and wherein the first holes are radially spaced about the central boss.

15. The power oscillating hand tool of claim 14, wherein the plurality of first holes includes three first holes equally spaced radially about the central boss.

16. The power oscillating hand tool of claim 10, wherein the platen includes a first ramp surface and the carrier plate includes a second ramp surface, the first and second ramp surfaces cooperating to secure a tip portion of the platen to the carrier plate.

17. The power oscillating hand tool of claim 10, wherein the tool is a sander.

18. A power oscillating hand tool comprising:

a drive unit;

a carrier plate interconnected to the drive unit, [the carrier plate including a tip portion and a first ramp surface];

a platen releasably secured on the carrier plate, the platen including *a tip portion and a first ramp surface and the cover plate including* a second ramp surface cooperating with the first ramp surface to secure the tip portion to the carrier plate.

19. The power oscillating hand tool of claim 18, wherein the first and second ramp surfaces angle upward in a rearward direction.

20. The power oscillating hand tool of claim 18, wherein the tool is a sander.

*21. A power oscillating sander having an electric motor comprising:*

*a housing defining an upper hand graspable handle and a forward curved surface, said housing having an upper periphery that generally extends from the front of the sander to the back of the sander and is substantially continuously convex; a manually operable switch to activate or deactivate the electric motor, said switch located on said forward curved surface of said handle and generally in front of the electric motor, whereby said switch is positioned to permit single-handed operation of said switch with one hand while said handle is being grasped by that same hand; and a platen defined by a rearward end terminating in two opposing corners from which sides extend and taper inwardly to form a forward tip; the forward curved surface of the housing extending from the front of the sander starting generally adjacent the platen.*

*22. The sander of claim 21 wherein said handle is convex.*

*23. The sander of claim 21 wherein said switch is located rearward of said platen tip and forward of said rearward end of said platen and said handle is palm graspable and allows the user to control the sander with the palm of a hand.*

*24. A power oscillating hand sander comprising:*

*a housing defining a handle and an interior cavity, said handle generally extending from the front of the sander to the back of the sander and having a substantially continuously convex top surface; a platen defined by a rearward end terminating in two opposing corners from which sides extend and taper inwardly to form a forward tip; and a motor located in said cavity and over said platen, said motor having a drive shaft which is perpendicularly orientated with respect to said platen; the handle extending from the front of the sander starting generally adjacent the platen.*

*25. The sander of claim 24 further comprising a switch which is located rearward of said platen tip and forward of said rearward end of said platen.*

*26. The sander of claim 24 wherein said opposing corners of said platen are rounded.*

*27. A power oscillating hand sander comprising:*

*a housing defining a convex shaped palm graspable handle, a forward curved surface located below and adjacent said handle, and an interior cavity, said handle generally extending from the front of the sander to the back of the sander having a substantially continuously convex top surface; a platen defined by a rearward end terminating in two opposing corners from which sides extend and taper inwardly to form a forward tip; a motor located in said cavity and over said platen, said motor having a drive shaft which is perpendicularly orientated with respect to said platen; and a manually operable switch to activate or deactivate the motor, said switch located on said forward curved surface and generally in front of said motor, whereby said switch is positioned to permit single-handed operation of said switch while said handle is being grasped in a palm of the single hand; the handle extending from the front of the sander starting generally adjacent the platen.*

*28. The sander of claim 27 wherein said switch is located rearward of said platen tip and forward of said rearward end of said platen.*

*29. The sander of claim 27 wherein said opposing corners of said platen are rounded.*

*30. A power oscillating hand sander having an electric motor comprising:*

*a housing defining an upper hand graspable handle having a predetermined length and a forward curved surface located below and adjacent to said graspable handle, said handle generally extending from the front of the sander to the back of the sander and having a substantially continuously convex top surface; a platen having a predetermined length, said platen defined by a rearward end terminating in two opposing corners from which sides extend and taper inwardly to form a forward tip;*

*a manually operable switch to activate or deactivate the sander, said switch located on said forward curved surface above and rearward of said platen tip, forward of said rearward end of said platen and generally in front of the electric motor, whereby said switch is positioned to permit single-handed operation of said switch while said handle is being grasped by said single hand; and a majority of the length of said handle being located over the length of said platen; the handle extending from the front of the sander starting generally adjacent the platen.*

*31. A power oscillating hand sander having a motor comprising:*

*a housing defining an interior cavity, a convex hand graspable handle having a predetermined length and a forward curved surface located generally in front of the*

*motor, said handle generally extending from the front of the sander to the back of the sander and having a substantially continuously convex top surface; a platen having a predetermined length and defined by a rearward end terminating in two opposing corners from which sides extend and taper inwardly to form a tip; a vertically orientated motor located in said cavity above said platen, said motor having a drive shaft which is perpendicularly orientated with respect to said platen; a manually operable switch to activate or deactivate the toot, said switch located on said forward curved surface above and rearward of said platen tip and forward of said rearward end of said platen, whereby said switch is positioned to permit single-handed operation of said switch while said handle is being grasped by said single hand; and said handle rearwardly offset with respect to said platen tip with a majority of said handle length located over the length of said platen; the handle extending from the front of the sander starting generally adjacent the platen.*

*32. A power oscillating hand sander comprising:*

*a housing defining an interior cavity, an upper convex hand graspable handle and a forward curved surface located below and adjacent to said graspable handle, said handle generally extending from the front of the sander to the back of the sander and having a substantially continuously convex top surface; a platen defined by a rearward end terminating in two opposing corners from which sides extend and taper inwardly to form a forward tip; a vertically orientated motor located in said cavity over said platen, said motor having a drive shaft which is perpendicularly orientated with respect to said platen; a manually operated switch to activate or deactivate the tool, said switch located on said forward curved surface above and rearward of said platen tip, forward of said rearward end of said platen and forward of said motor, whereby said switch is positioned to permit single-handed operation of said switch while said handle is being grasped by said single hand; and said handle rearwardly offset with respect to said platen tip with a majority of said handle located over said platen; the handle extending from the front of the sander starting generally adjacent the platen.*

*33. A power oscillating hand grasped sander comprising:*

*a housing defining an interior cavity, an upper convex hand graspable handle and a forward curved surface located below and adjacent to said graspable handle, said housing generally extending from the front of the sander to the back of the sander and having a substantially continuously convex top surface; a platen defined by a rearward end terminating in two opposing corners from which sides extend and taper inwardly to form a forward tip; a vertically orientated motor located in said cavity over said platen, said motor having a drive shaft which is perpendicularly orientated with respect to said platen; a manually operable switch to activate or deactivate the sander, said switch located on said forward curved surface over and rearward of said platen tip and generally in front of said motor, whereby said switch is positioned to permit single-handed operation of said switch while said handle is being grasped by said single hand; and said handle rearwardly offset with respect to said platen tip with a majority of said handle located over said platen and with a minority of said handle displaced rearwardly of said platen; the housing extending from the front of the sander starting generally adjacent the platen.*

*34. A power sander comprising:*

*a housing that generally extends from the front of the sander to the back of the sander and has a substantially continuously convex top surface; a platen disposed below said housing, said platen having a rear end defined by two opposing corners, said platen tapering inwardly forward from said rear end in a first direction to form a forward tip portion;*

*a motor disposed within said housing; and*

*said housing defining a graspable handle such that the majority of the graspable handle as measured along the first direction is disposed over said platen; the housing extending from the front of the sander starting generally adjacent the platen.*

*35. The sander recited in claim 34, wherein said first direction is a longitudinal direction of said platen.*

*36. The sander recited in claim 35, wherein at least a substantial portion of said graspable handle is defined above said motor.*

*37. The sander recited in claim 35, wherein at least two-thirds of said graspable handle is disposed over said platen.*

*38. The sander recited in claim 35, said sander further comprising a manually operable switch disposed on a forward surface of said housing.*

*39. The sander recited in claim 38, wherein said forward surface of said housing is curved.*

*40. A palm grip sander comprising:*

*a housing;*

*a platen disposed below said housing, said platen having a rear end defined by two opposing corners, said platen tapering inwardly forward from said rear end in a longitudinal direction to form a forward tip Portion, said platen having a major working surface and oscillated about an oscillating axis which is substantially perpendicular to the major surface; a motor disposed within said housing; wherein said housing defines a top surface that generally extends from the front of the sander generally adjacent the platen to the back of the sander and that is substantially continuously convex and is the primary grasping surface of said sander such that said sander is gripped with a user's hand intersected by said oscillating axis.*

* * * * *